Figure 1:
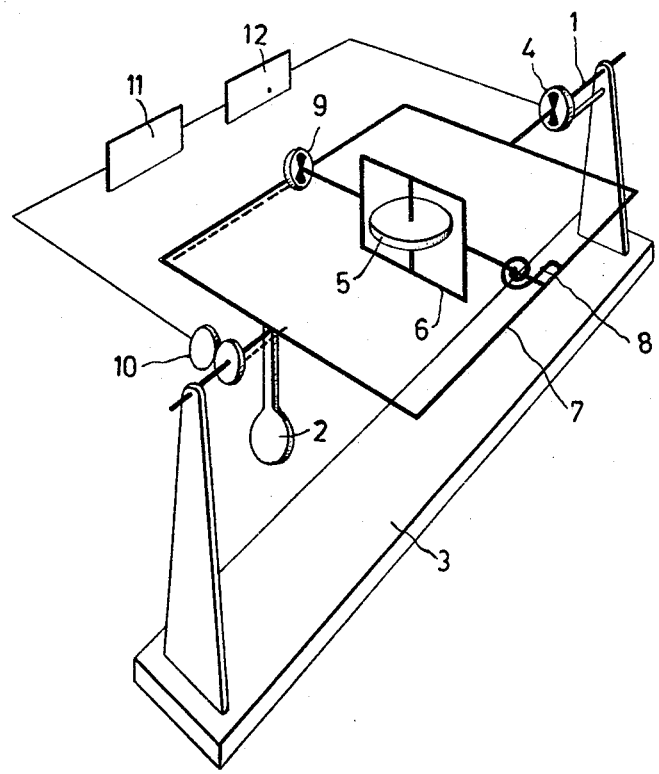

Sept. 13, 1966  N. F. HECTOR  3,272,017
NAVIGATION APPARATUS

Filed Dec. 18, 1961  5 Sheets-Sheet 1

INVENTOR
*NILS FOLKE HECTOR*

BY
AGENT

United States Patent Office 3,272,017
Patented Sept. 13, 1966

3,272,017
NAVIGATION APPARATUS
Nils Folke Hector, Solna, Sweden, assignor to North American Philips Company, Inc., New York, N.Y., a corporation of Delaware
Filed Dec. 18, 1961, Ser. No. 160,015
Claims priority, application Sweden, Dec. 21, 1960, 12,378/60
9 Claims. (Cl. 74—5.34)

This invention relates generally to a true vertical indicating device used for navigation purposes and including a gimbal supported platform and a pendulum arrangement having mutually transversal sensing directions. The pendulum arrangement comprises means for measuring the angular acceleration thereof in each sensing direction relative to a space-fixed reference direction and means electrically connected to the said measuring means for introduction to the pendulum arrangement of a torque having a magnitude proportional to the said angular acceleration as measured by the said measuring means this torque counteracts the angular acceleration in the respective sensing direction, the constants in the feed-back loops of the pendulum arrangement being such in relation to the unbalance of the pendulum arrangement in the respective sensing direction, that the pendulum arrangement as a whole is Schuler-tuned. The invention also relates to a navigation apparatus using such a true vertical indicating device.

A true vertical indicating device of this kind is known, for instance, from U.S. Patent 2,893,248. In the device described in said patent, each of the pendulum means is arranged to support a gyroscope means, the suitably restrained output shafts of the gyroscopes then being arranged to precess due to angular movements of the pendulum means relative to space-fixed reference directions. A gyroscopic feedback to the pendulum means is thus established so that the pendulum means by suitable dimensioning can be Schuler-tuned, which means that the pendulum means are imparted an oscillation time of about 84 minutes. In other words, by the angular movements of the gyroscopic means about the output axes the moment of inertia of the pendulum means is apparently increased; this principle is also shown in the Swedish Patent 47,252, published in 1920.

Dimensioning of the apparatus for accelerations which can appear instantaneously in navigation apparatus, however, lowers the sensitivity of the apparatus; this is due in part to friction and damping of the output shafts of the gyroscopic means which in this case must be relatively weakly restrained to allow angular movements of sufficient magnitude and which transmit an appreciable gyroscopic torque.

The present invention provides a true vertical indicating device which functions with extremely high accuracy under the said circumstances and in which is very suitable for use in navigation apparatus. According to one aspect of the invention, the pendulum arrangement comprises individual Schuler-tuned pendulum means for each sensing direction supported by the common platform, the latter being arranged to be controlled by the pendulum means via angular sensing devices arranged at the pendulum shafts and servo motors arranged at the supporting shafts for the platform such that the platform in each sensing direction is forced to maintain the same angular position relative to said space fixed reference direction as does the corresponding pendulum means.

In a preferred embodiment the said measuring means comprise gyroscopic means. Thus the pendulum means co-operate with gyroscopic means for achieving Schuler-tuning as in the known arrangement; however, according to the invention the gyroscopic means are not used for feeding torques to the pendulum means but instead are used as measuring instruments for sensing the angular movements of the pendulum means. As a result, the true vertical indication can be made with appreciably higher sensitivity.

Figure 2:
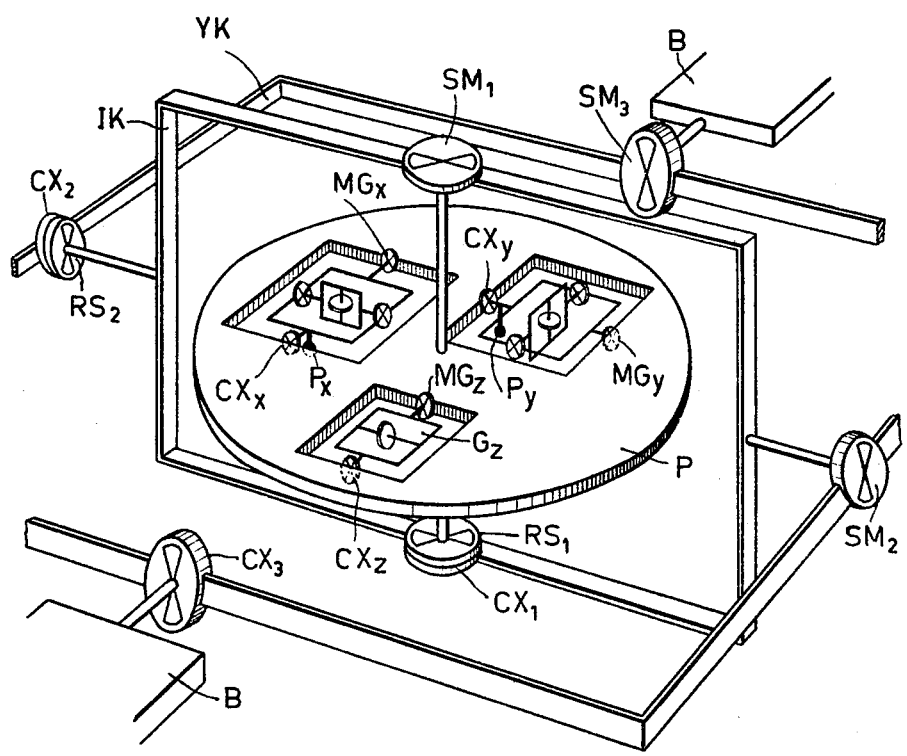
Figure 3:
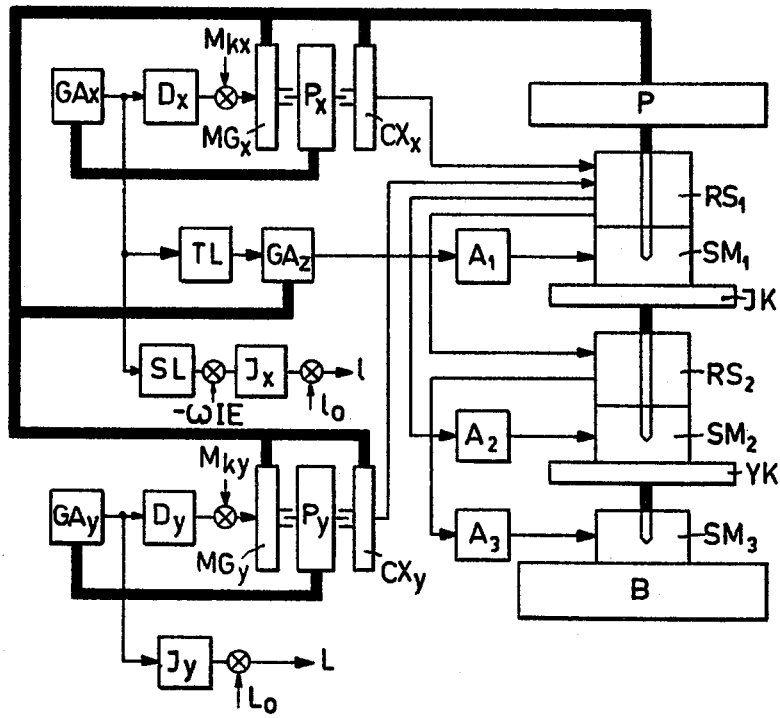
Figure 4:
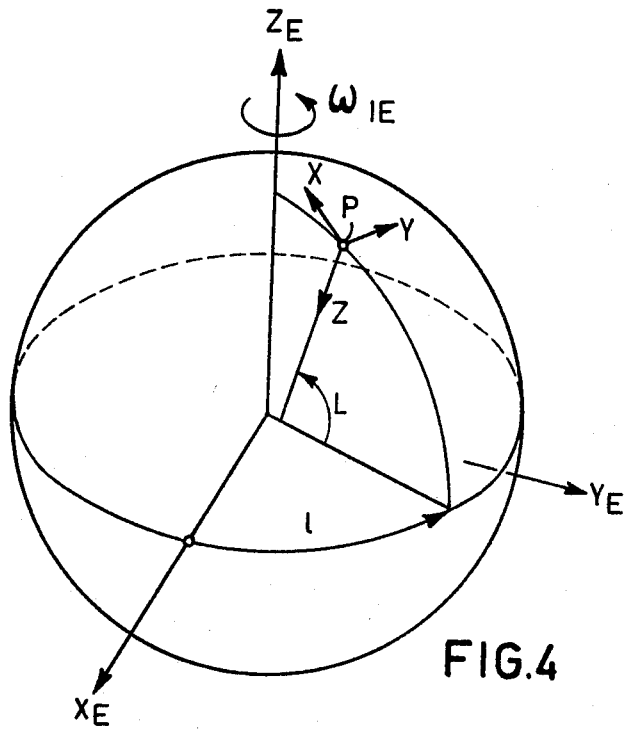
Figure 5:
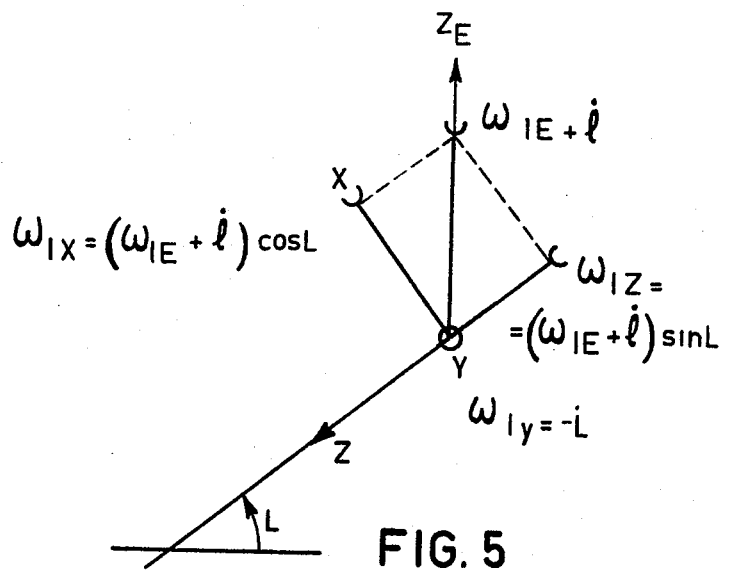
Figure 6:
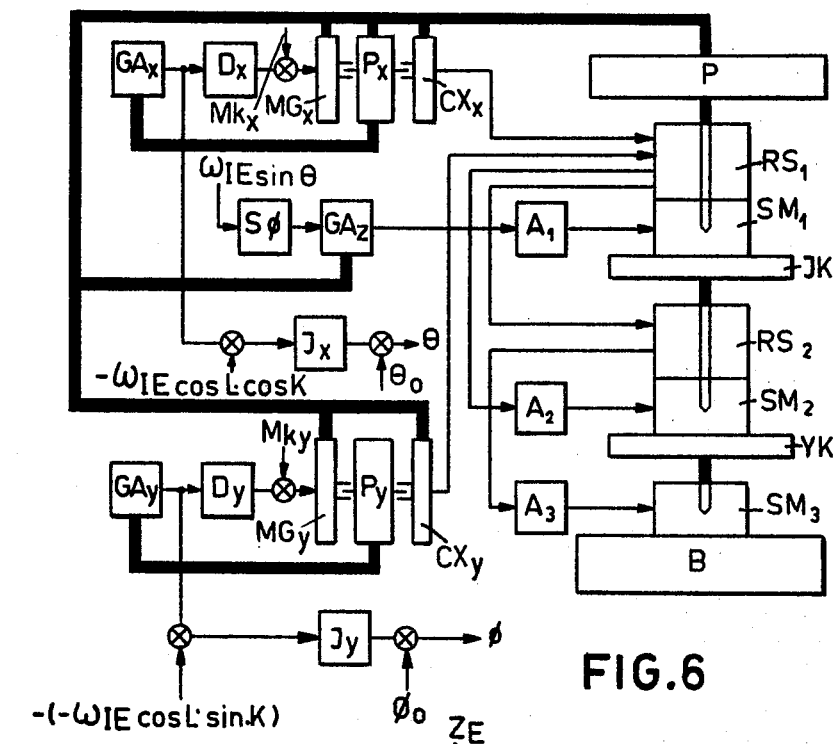
Figure 7:
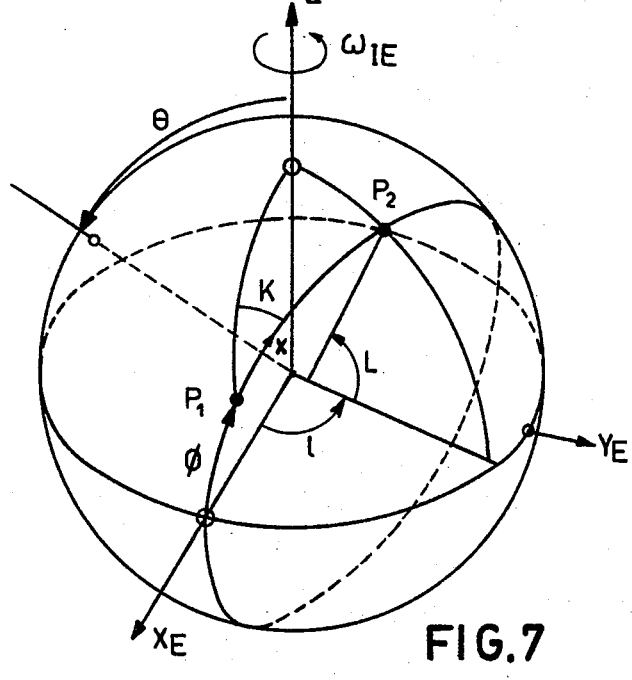

The invention will now be described more fully in connection with the accompanying drawings in which FIG. 1 shows an one-axis pendulum having an artificial moment of inertia, FIG. 2 shows a Schuler-tuned, three axes platform, FIG. 3 and 6 show circuit diagrams in block form for two navigation devices and FIGS. 4, 5 and 7 illustrate the orientation of co-ordinate systems used and the components resulting from the rotation of earth.

In FIG. 1 a pendulum 2 fixed to a shaft 1 is rotatably journalled in a support 3. Upon the shaft 1 is located a torque generator 4 whose rotor is fixed to the shaft 1 and whose stator is fixed to the support 3. The torque generator 4, which is adapted to produce torques rather than rotation movements, produces a torque proportional to the current fed to it. For achieving an artificial moment of inertia beyond the moment of inertia for the shaft 1 itself, the angular acceleration of the shaft 1 is measured in a suitable manner and a current proportional to the angular acceleration is produced, which current is fed to the torque generator in such a direction that to the shaft 1 there is introduced a torque which counter-acts the angular acceleration. The current is fed to the torque generator via an amplifier and by suitable choice of the proportionality and amplifying factors an exact Schuler-tuning can be achieved.

For measuring the angular acceleration preferably the rate-gyro device shown in FIG. 1 is used. This device consists substantially of a gyroscope 5 which has an inner gimbal 6 (output shaft) elastically coupled to an outer gimbal 7 (input shaft) by means of a spring 8, which can be either mechanically as shown or the electric analog thereof. According to the gyro relation $M = H \times \bar{\omega}$ where $M$ = torque about the output axis, $\bar{\omega}$ = the angular velocity $d\theta/dt$ about the input axis, $H$ = the impulse moment about the spin axis of the gyroscope and the spring equation $$M = k.\psi$$

there is proportionality between the angular deflection $\psi$ of the output shaft and the angular velocity $\omega$ of the input shaft. Thus, by means of an angular sensing device 9 actuated by the output shaft, a signal is produced which is proportional to the angular velocity of the input shaft i.e. to the angular velocity of the shaft 1, since the gimbal 7 is fixed to this shaft. This signal is picked off via slip rings 10 and is fed to a differentiating means 11, so that a signal proportional to the angular acceleration of the shaft 1 is produced, which signal is fed to the torque generator 4 via an amplifier 12. A rate-gyro device is usually arranged in an envelope filled with fluid and so dimensioned that a balancing of the bearing pressures of the output shaft is obtained due to the lifting action of the fluid. It is preferably so arranged that also the bearing pressures of the shaft 1 are balanced by enclosing the combined gyroscopic and pendulum means including torque generators and angular sensing devices in an envelope filled with fluid, the two shafts then being arranged either in the same fluid phase or in different phases.

In FIG. 2 there is shown as an example an embodiment of a true vertical indicating device according to the invention, adapted to be used in a navigation apparatus. FIG. 2 shows a horizontal platform P, which is gimbal supported in relation to a base B in an inner gimbal IK and an outer gimbal YK. The platform is rotatable relative to the inner gimbal IK about a vertical axis, and the platform P and the two gimbals IK, YK are at respective rotation shafts each provided with a servomotor SM and an angular sensing device or signal generator CX, and between the platform P and the inner gimbal IK and between the inner gimbal IK and the outer gimbal YK there are arranged resolving means RS. Two Schuler-tuned pendulum means $P_x$, $P_y$ having horizontal, mutually perpendicular input axes are arranged on the platform P. These pendulum means are constructed in accordance with FIG. 1, the input shafts besides torque generators $MG_x$ and $MG_y$, respectively, being provided with angular sensing devices or signal generators $CX_x$ and $CX_y$, respectively. The two combined pendulum and gyroscopic devices with the signal generators $CX_x$ and $CX_y$ can be arranged in a common envelope filled with fluid or in separate envelopes. Further a course indicating device consisting of a gyroscope $G_z$ is arranged on the platform P, which gyroscope due to rotation about a vertical input axis precesses and rotates an output shaft provided with a torque generator $MG_z$ and an angular sensing signal generator $CX_z$ arranged between the output shaft and the platform.

As shown in connection with FIG. 1 the pendulum means $P_x$ and $P_y$ will indicate the true vertical independent of horizontal accelerations and the platform P is in a manner known per se maintained perpendicular to the vertical direction indicated by the pendulum means $P_x$ and $P_y$. Thus, in the embodiment shown the angles of the pendulum means $P_x$ and $P_y$ relative to the platform P are determined by means of the angular sensing signal generators $CX_y$ and $CX_x$ whereafter the signals corresponding to these angles are transmitted to the servo motors $SM_2$ and $SM_3$ via the resolving means $RS_1$. The function of the resolving means $RS_1$ is to compensate in a way known per se for changes in the relative position between the platform and the inner gimbal IK so that the signals from the angular sensing signal generators $CX_x$ and $CX_y$ are distributed in correct proportions to the different servo motors for all relative positions between the platform and the inner gimbal. The angular signal fed to the servo motor $SM_3$ is also fed via the resolver $RS_2$ for compensating the effect of angular changes between the gimbals. The angular position of the platform P relative to the base B can, if required, be transmitted to an instrument by means of angular sensing devices or signal generators $CX_1$, $CX_2$ and $CX_3$ arranged at the shafts of the platform and the gimbals.

In FIG. 3 there is shown a circuit diagram in block form for a complete navigation apparatus comprising the true vertical indicating device shown in FIG. 2, this device having the same reference numerals in both figures. The outer gimbal YK is rotatably arranged on the base B by means of the servo motor $SM_3$. The inner gimbal IK can be rotated relative to the outer gimbal by means of the servo motor $SM_2$ and angular movements between the gimbals are transmitted to the resolving means $RS_2$. The platform P, the servo motor $SM_1$ and the resolver $RS_1$ are arranged in the same way on the inner gimbal IK. The pendulum means $P_x$ and $P_y$ with co-operating gyroscopic means $GA_x$ and $GA_y$, respectively, are rotatably arranged on the platform P. The gyroscopic means $GA_x$ and $GA_y$ deliver signals proportional to the angular velocities of the pendulum means $P_x$ and $P_y$, respectively. The signals are fed to differentiating networks $D_x$ and $D_y$, respectively, so that signals proportional to the angular accelerations are produced. These signals are fed to the torque generators $MG_x$ and $MG_y$ for achieving Schuler-tuning of the pendulum means as previously shown. The rotation angles of the pendulum means $P_x$ and $P_y$, respectively relative to the platform P are measured by means of the angular sensing devices $CX_x$ and $CX_y$, respectively, and in known way fed to the resolving means $RS_1$ while the angular components produced by this resolving means are fed via $A_2$ to the servo motor $SM_2$ and via the resolver $RS_2$ and $A_3$ to the servo motor $SM_3$.

In the navigation apparatus described it is intended to produce signals representing the position in a longitude-latitude system. For this purpose the gyroscopic means $GA_z$ is arranged to maintain the platform P in a direction with the input axes of the gyroscopic means $GA_x$ and $GA_y$ parallel with the local meridian tangent direction and the local parallel circle tangent direction. A space-fixed course can as known be maintained by providing the output shaft of the gyroscopic means $GA_z$ with an angular sensing device $CX_z$ which via an amplifier $A_1$ feeds the servo motor $SM_1$ such that upon a rotation of the output shaft the servo motor rotates the platform in such a direction that the output shaft is restored by the gyroscope. However, for maintaining the platform P in the said direction the platform P must be rotated by the gyroscopic means $GA_z$ upon every movement of the platform relative to the surface of the earth in the parallel circle tangent direction, as well as upon movement of the platform in this direction due to the rotation of the earth, the magnitude of this latter rotation being dependent on the actual latitude. This is illustrated in FIG. 4, which shows the orientation of the platform P relative to the earth. The input axis directions for the gyroscopic means arranged on the platform P are referenced $x$, $y$ and $z$, respectively, the $x$-direction being coincident with the meridian tangent direction. The position of the platform is indicated by the latitude $L$ and the longitude $l$. An earth-fixed co-ordinate system $X_e$, $Y_e$ and $Z_e$ is shown, the $Z_e$-axis being coincident with the rotation axis of the earth. The rotation of the earth about its axis (the rotation about the sun can be neglected) is represented by the angular velocity $\omega_{IE}$. Thus according to FIG. 5 the angular velocities of the platform about the axes $x$, $y$, $z$ and $Z_e$ will be as follows:

$$\omega_{Ix} = \left(\omega_{IE} + \frac{dl}{dt}\right) \cos L$$

$$\omega_{Iy} = -\frac{dL}{dt}$$

$$\omega_{Iz} = -\left(\omega_{IE} + \frac{dl}{dt}\right) \sin L$$

$$\omega_{Iz_E} = \omega_{IE} + \frac{dl}{dt}$$

$\left(\frac{dl}{dt} \text{ and } \frac{dL}{dt} \text{ the velocities of the platform in longitude and latitude direction, respectively}\right)$ The output shaft of the gyroscopic means $GA_z$ therefore is provided with a torque generator $MG_z$ to which the signal from the angular sensing device 9 (FIG. 1) in the gyroscopic means $GA_x$ is fed via a multiplicating means TL. This signal is proportional to the angular velocity of the pendulum means $P_x$:

$$\omega_{Ix} = \left(\omega_{Ix} + \frac{dl}{dt}\right) \cos L$$

and in the multiplicating means TL the signal is multiplicated with $\tan L$ so that a signal having the magnitude $$\left(\omega_{IE} + \frac{dl}{dt}\right) \cdot \sin L$$

is obtained, which signal when fed to the torque generator $MG_z$ brings the servo motor $SM_1$ to rotate the platform P about the $z$-axis with the angular velocity $$\left(\omega_{IE} + \frac{dl}{dt}\right) \sin L$$

i.e. with the required velocity $\omega_{Iz}$.

The signal produced by the gyroscopic means $GA_x$, which signal is proportional to $\omega_{Ix}$, is also fed to a second multiplicating means SL, in which the signal is multiplicated with the secand for the latitude so that a signal proportional to $$\left(\omega_{IE}+\frac{dl}{dt}\right)$$

is obtained (FIG. 5), which signal after subtraction with a signal with constant magnitude representing the rotation of earth $\omega_{IE}$ is fed to an integrating means $I_x$. Thus, at the output of the integrator the integrated value of $dl/dt$ is obtained, i.e. a signal proportional to a change of longitude and to this signal a signal representing an initial value $l_0$ is added, so that a signal is obtained representing the longitude $l$ for the position of the platform.

The corresponding signal from the gyroscopic means $GA_y$, proportional to the angular velocity $$\omega_{Iy}=-\frac{dl}{dt}$$

(FIG. 5) is fed to a second integrating means $I_y$ and after adding an initial value $L_0$ a signal is obtained representing the latitude $L$ for the position of the platform. This signal is used also for setting the multiplicating means TL and SL which can be effected manually or automatically.

The navigation apparatus according to the invention is also useful when navigating along a predetermined meridian or a predetermined great circle. A navigation system of this type is used i.e. in case of navigation in polar regions and the position then being indicated by means of co-ordinates in a perpendicular co-ordinate system in which one of the axes is formed by the predetermined meridian or great circle. A circuit diagram in block form for a navigation apparatus chosen as an example is shown in FIG. 6 and the orientation of the platform is illustrated in FIG. 7, in which the platform is assumed to be moving from a point $P_1$ to a point $P_2$ along a great circle $\phi$ the plane of which makes the angle $\theta$ with the earth axis $z_E$. The great circle tangent makes an angle K with the meridian tangent at the point $P_1$.

FIG. 6 differs from the FIG. 3 in the respect that the feeding of the gyroscopic means $GA_z$ is effected by means of a signal proportional to $\omega_{IE}.\sin L$, because $dl/dt$ in the equation for $\omega_{Iz}$ in FIG. 5 in this case shall not produce any rotation of the platform. $\omega_{IE}.\sin L$ is simply obtained by feeding a signal proportional to $\omega_{IE} \sin \theta$ to a multiplicating means $S\phi$ for multiplicating the signal with $\sin \phi$. The same is valid for the feeding of the integrating means $I_x$ and $I_y$, the signals from the gyroscopic means $GA_x$ and $GA_y$ in this case being fed to the integrating means $I_x$ and $I_y$ after subtraction by signals representing the earth rotation components at the actual latitude for respective input axes i.e. signals proportional to $\omega_{IE} \cos L \cos K$ and $-\omega_{IE} \cos L \sin K$, respectively. Thus, after addition with the initial values $\theta_0$ and $\phi_0$ signals are obtained at the outputs of the integrating means representing the position in terms of $\theta$ and $\phi$.

According to FIGS. 3 and 6 signals $M_{kx}$ and $M_{ky}$ are added to the signals produced by $D_x$ and $D_y$. These signals are correction signals, which are added for reducing the effect of the ellipticity of the earth, changes in height of the platform, acceleration terms due to the rotation of earth and the coriolis acceleration. The effect of these factors is however normally very small and these signals may therefore be omitted.

While the invention has been described with respect to specific embodiments, it is understood that various modifications thereof will readily occur to those skilled in the art without departing from the inventive concept, the scope of which is set forth in the appended claims.

What is claimed is:

1. A true vertical indicating device comprising: a platform mounted in gimbals and supporting two pendulum means which are Schuler-tuned by gyroscopic means, the pendulum means having mutually perpendicular, horizontal rotation axes coincident with the sensing axes or input axes of the respective co-operating gyroscopic means, said platform being arranged to occupy a predetermined angular position relative to the pendulum means by means of servo motors and resolving means arranged at the supporting shafts for the platform and by means of angular sensing devices or signal generators arranged at shafts coincident with the pendulum axes, the gyroscopic means being arranged to sense the angular movements of the pendulum means relative to space-fixed reference directions and to co-act with means for producing signals which are proportional to the angular accelerations of the pendulum means, the gyroscopic means being arranged to precess as a result of rotation about respective input axes under suitable restraining of output shafts perpendicular to the input axes, and signal generators arranged at the output shafts for producing signals proportional to the angular velocities of shafts coincident with respective input axes, said signal generators being connected to respective torque generators through differentiating means, said torque generators feeding to the pendulum means counteracting torques proportional to the angular accelerations of the pendulum means with proportionality constants corresponding to Schuler-tuning.

2. A true vertical indicating device comprising: a platform mounted in gimbals and supporting two pendulum means which are Schuler-tuned by gyroscopic means, the pendulum means having mutually perpendicular, horizontal rotation axes coincident with the sensing axes or input axes of the respective co-operating gyroscopic means, said platform being arranged to occupy a predetermined angular position relative to the pendulum means by means of servo motors and resolving means arranged at the supporting shafts for the platform and by means of angular sensing devices or signal generators arranged at shafts coincident with the pendulum axes, the gyroscopic means being arranged to sense the angular movements of the pendulum means relative to space-fixed reference directions and to co-act with means for producing signals which are proportional to the angular accelerations of the pendulum means, the gyroscopic means being arranged to precess as a result of rotation about respective input axes under suitable restraining of output shafts perpendicular to the input axes, and signal generators arranged at the output shafts for producing signals proportional to the angular velocities of shafts coincident with respective input axes, said signal generators being connected to respective torque generators through differentiating means, said torque generators feeding to the pendulum means counteracting torques proportional to the angular accelerations of the pendulum means with proportionality constants corresponding to Schuler-tuning, the two pendulum means with co-operating gyroscopic means, torque generators and angular sensing devices being arranged in envelope means filled with fluid, said fluid acting to maintain a balancing of all bearing pressures in the device.

3. A true vertical indicating device comprising: a platform mounted in gimbals and supporting two pendulum means which are Schuler-tuned by gyroscopic means, the pendulum means having mutually perpendicular, horizontal rotation axes coincident with the sensing axes or input axes of the respective co-operating gyroscopic means, said platform being arranged to occupy a predetermined angular position relative to the pendulum means by means of servo motors and resolving means arranged at the supporting shafts for the platform and by means of angular sensing devices or signal generators arranged at shafts coincident with the pendulum axes, the gyroscopic means being arranged to sense the angular movements of the pendulum means relative to space-fixed reference directions and to co-act with means for producing signals which are proportional to the angular accelerations of the pendulum means, the gyroscopic means being arranged to precess as a result of rotation about respective input axes under suitable restraining of output shafts perpendicular to the input axes, and signal generators arranged at the output shafts for producing signals proportional to the angular velocities of shafts coincident with respective input axes, said signal generators being connected to respective torque generators through differentiating means, said torque generators feeding to the pendulum means counteracting torques proportional to the angular accelerations of the pendulum means with proportionality constants corresponding to Schuler-tuning, the two pendulum means with co-operating gyroscopic means, torque generators and angular sensing devices being arranged in envelope means filled with fluid, said fluid acting to maintain a balancing of all bearing pressures in the device, a servo motor actuated by a course indicating device and arranged at a vertical supporting shaft for the platform to maintain the platform in such a direction that the input axes of the gyroscopic means are coincident with the local meridian tangent direction and the local parallel circle tangent direction, respectively, integrating means connected to the angular sensing signal generators of the true vertical indicating gyroscopic means, the signal generator associated with the gyroscopic means the input axis of which is coincident with the meridian tangent direction being connected to the integrating means by a multiplier for multiplying the signal from the signal generator with a signal representing the secant for the latitude and by subtraction means for subtracting a signal representing the rotation of the earth, whereby signals appear at the outputs of the integrating means which are proportional to changes in latitude and longitude, respectively, upon movement of the platform in the horizontal direction.

4. A true vertical indicating device comprising: a platform mounted in gimbals and supporting two pendulum means which are Schuler-tuned by gyroscopic means, the pendulum means having mutually perpendicular, horizontal rotation axes coincident with the sensing axes or input axes of the respective co-operating gyroscopic means, said platform being arranged to occupy a predetermined angular position relative to the pendulum means by means of servo motors and resolving means arranged at the supporting shafts for the platform and by means of angular sensing devices or signal generators arranged at shafts coincident with the pendulum axes, the gyroscopic means being arranged to sense the angular movements of the pendulum means relative to space-fixed reference directions and to co-act with means for producing signals which are proportional to the angular accelerations of the pendulum means, the gyroscopic means being arranged to precess as a result of rotation about respective input axes under suitable restraining of output shafts perpendicular to the input axes, and signal generators arranged at the output shafts for producing signals proportional to the angular velocities of shafts coincident with respective input axes, said signal generators being connected to respective torque generators through differentiating means, said torque generators feeding to the pendulum means counteracting torques proportional to the angular accelerations of the pendulum means with proportionality constants corresponding to Schuler-tuning, the two pendulum means with co-operating gyroscopic means, torque generators and angular sensing devices being arranged in envelope means filled with fluid, said fluid acting to maintain a balancing of all bearing pressures in the device, the platform being maintained in a direction with the input axes of the gyroscopic means coincident with a predetermined meridian tangent direction or great circle tangent direction or a direction perpendicular to these directions, respectively, by means of a servo motor controlled by a course indicating device and arranged at a vertical supporting shaft for the platform, integrating means connected to the angular sensing signal generators of the vertical indicating gyroscopic means by subtraction means for subtracting signals representing the earth rotation components at the actual latitude for corresponding input axes, whereby signals appear at the outputs of the integrating means which are proportional to changes in position along the two input axis directions upon movement of the platform in the horizontal direction.

5. A device as set forth in claim 2, wherein said envelope means comprises a single envelope filled with said fluid.

6. A device as set forth in claim 2, wherein said envelope means comprises a plurality of separate envelopes filled with fluid.

7. Apparatus as claimed in claim 3, wherein the course indicating device comprises a course indicating gyroscope arranged on the platform, said course indicating gyroscope having a vertical input axis and being provided with an angular sensing signal generator co-operating with its output shaft for feeding the servo motor co-operating with the course indicating device, and a torque generator acting on said output shaft, the signal from the gyroscopic means whose input axis is coincident with the local meridian tangent direction being fed to the torque generator by a multiplier for multiplying the signal from the said last gyroscopic means by a tangent for the latitude.

8. Apparatus as claimed in claim 4, wherein the course indicating device comprises a course indicating gyroscope arranged on the platform, said course indicating gyroscope having a vertical input axis and being provided with an angular sensing signal generator co-operating with its output shaft for feeding the servo motor co-operating with the course indicating device, and a torque generator acting on said output shaft, to which torque generator is fed a signal representing the earth rotation multiplied by a sine for the latitude.

9. Apparatus as claimed in claim 3, further including means for superimposing the signals at the outputs of the integrating means on signals representing initial position values.

References Cited by the Examiner

UNITED STATES PATENTS

| | | | |
|---|---|---|---|
| 2,729,107 | 1/1956 | Braddon | 74—5.34 |
| 2,752,792 | 7/1956 | Draper et al. | 74—5.34 |
| 2,809,526 | 10/1957 | Lundberg | 74—5 |
| 2,811,043 | 10/1957 | Bonnell | 74—5.34 |
| 2,893,248 | 7/1959 | Ecary | 74—5.34 |

FRED C. MATTERN, JR., *Primary Examiner.*

BROUGHTON G. DURHAM, *Examiner.*

T. W. SHEAR, P. W. SULLIVAN, *Assistant Examiners.*